United States Patent [19]
Hsieh

[11] Patent Number: 5,660,082
[45] Date of Patent: Aug. 26, 1997

[54] ADJUSTABLE BRAKE CONTROL FOR A BICYCLE

[76] Inventor: Wen Cheng Hsieh, 29334 Golden Meadow Dr., Rancho Palos Verdes, Calif. 90275

[21] Appl. No.: 545,249

[22] Filed: Oct. 19, 1995

[51] Int. Cl.[6] .............................. F16C 1/10; G05G 11/00
[52] U.S. Cl. .............................. 74/502.2; 74/489
[58] Field of Search .................. 74/502.2, 489, 74/500.5, 524, 526, 528, 523, 527, 529; 188/24.11, 24.12

[56] References Cited

U.S. PATENT DOCUMENTS

| | | | |
|---|---|---|---|
| 4,005,613 | 2/1977 | Kaufman et al. | 74/489 |
| 4,611,500 | 9/1986 | Nagano | 74/489 |
| 4,779,482 | 10/1988 | Kawaguchi | 74/489 X |
| 4,903,799 | 2/1990 | Romano | 74/489 X |
| 5,279,179 | 1/1994 | Yoshigai | 74/502.2 |
| 5,287,765 | 2/1994 | Scura | 74/489 |
| 5,515,743 | 5/1996 | Lumpkin | 74/502.2 |
| 5,537,891 | 7/1996 | Nagano et al. | 74/502.2 X |

Primary Examiner—Vinh T. Luong
Attorney, Agent, or Firm—Curtis L. Harrington

[57] ABSTRACT

The brake lever system includes a cable attachment fitting which rides within an open slot of a brake lever body which tilts away from the departure point of the brake cable as a brake lever body is pivoted away from a brake lever housing. A threaded screw or rod carried within the open slot can be adjusted to raise or lower the height of a rectangular or other block which rides without turning within the open slot and which forms an adjustable lower limit below which the cable attachment fitting cannot travel. When activated, the cable attachment fitting moves in the direction of the point of pivot and the mechanical advantage is increased to the limit permitted by the metal block within the open slot. This produces a rapid closure of the brakes during the first extent of brake engagement, and a much less rapid closure as the brake lever body is displaced from the brake lever housing. The brake lever system of the present invention can be adjusted during the riding operation of the bicycle to adjust for brake pad wear and for changing conditions which might cause the brake cable to expand or contract.

7 Claims, 5 Drawing Sheets

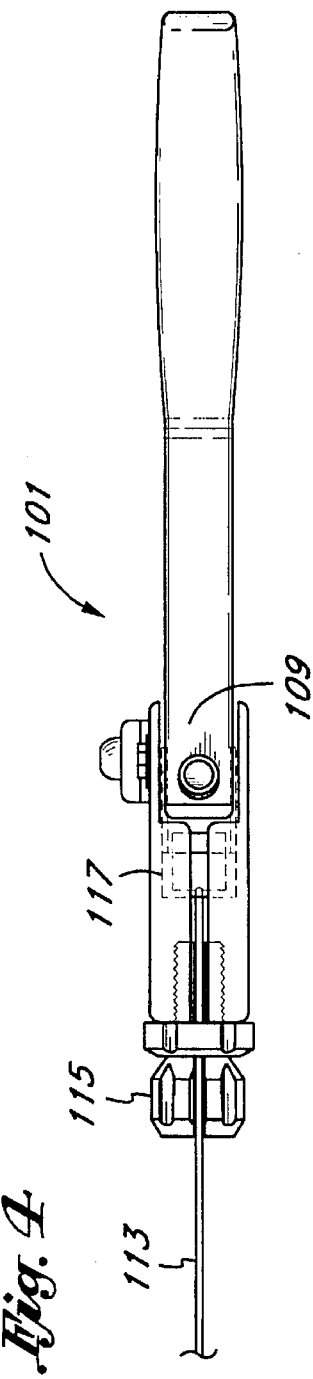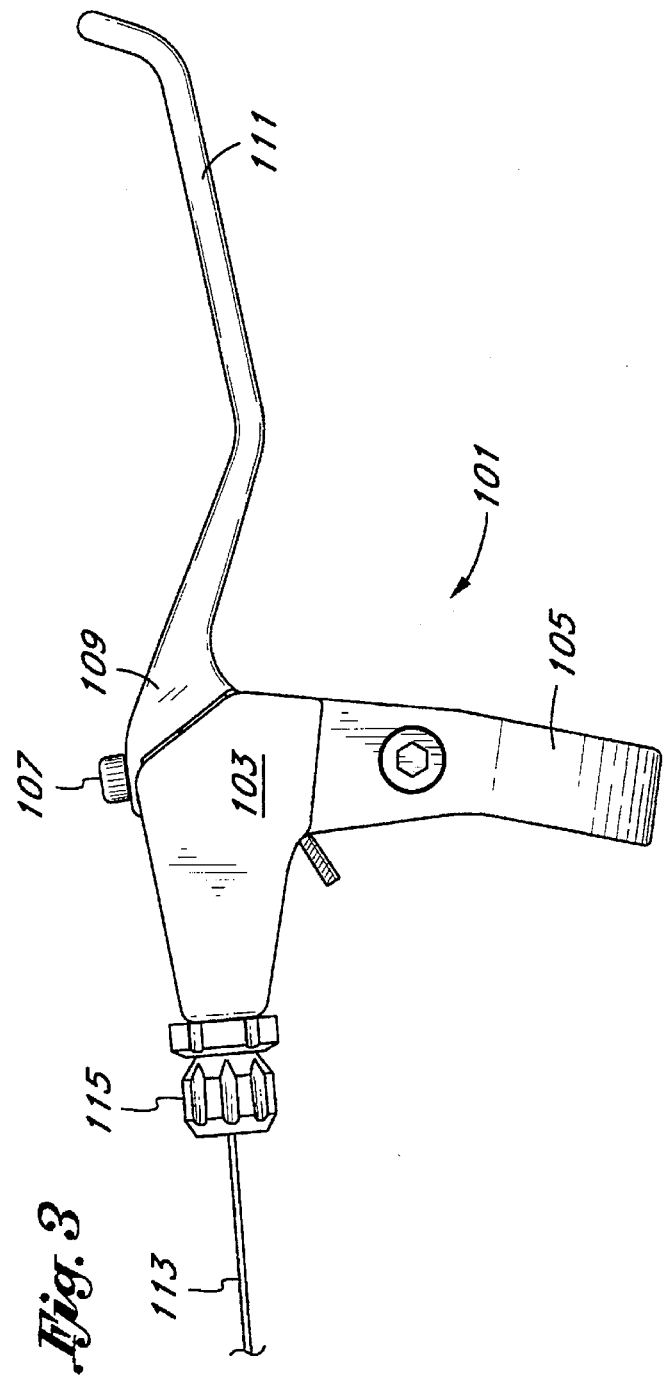

ADJUSTABLE BRAKE CONTROL FOR A BICYCLE

FIELD OF THE INVENTION

The present invention relates to the field of an improved, adjustable hand brake for a bicycle which enables continuous adjustment of the maximum mechanical advantage to be applied to a braking system while enabling the brakes to return to a maximum open position after the application of braking.

BACKGROUND OF THE INVENTION

Bicycle brakes include hand brakes mounted to the handle bars of a bicycle. The hand brake usually includes a circular mounting portion which surrounds the handle bar, and which supports a main housing. The main housing usually supports a brake lever pivotally mounted to the main housing. The main housing may engage an annular brake cable assembly in a manner to allow the brake lever to pull the center brake cable with respect to the outer brake cable.

In most bicycles, the inner brake cable is connected directly to a point on the brake lever. In this instance, the angular displacement of the pivoting action of the lever translates into a proportional closing of the brake shoes against the wheel rim. There may be some trigonometric effect since the inner cable is being pivoted away from a support point in the brake lever housing. However, since the inner brake cable is supported at a constant radius from the pivot point, this effect in a standard system is not as pronounced.

In more specialized systems, there exists the possibility to increase the mechanical advantage to be applied to the brake cable. This is accomplished by reducing the radial distance between the end of the inner brake cable being pulled and the axis of pivot of the brake lever. In one known configuration, a series of spacers may selectively removed to enable a reduced radius. However, the user cannot adjust the system during the riding of the bicycle. This situation is potentially dangerous since the brake system of a bicycle becomes more loosely linked over time. The brake pads wear, the brake cable and associated hardware can become stretched if the brakes are applied too strongly. If any of the brake system changes during a ride such that brake lever displacement becomes insufficient to engage the brakes, the rider will have lost a portion or all of his braking ability.

Further, the use of removable inserts enables only discrete adjustment. Removal of one insert may immediately make the braking system too lax and eliminate braking ability, forcing a re-adjustment of the braking system. If the braking system becomes too lax, and if the user has the luxury of re-adjusting the system, the overall range of pull available to the system will still be limited.

Another system which is known uses a set screw to force a second pivoted fitting outward to force the brake cable to be pulled from a radially fixed perspective as the brake lever is depressed. This system is not adjustable by the rider during operation of the bicycle and requires a hexagon wrench since it is a hard adjustment of a set screw which bears against a portion of the brake lever. The device cannot be adjusted to give a smaller radial distance from the point of cable pull to the point of pivot. Thus, adjustability extends from a starting point of minimum adjustment to a maximum radius of the cable pull to the point of pivot. Further, adjustment to maximum has been shown to lift the point of cable pull too far from the point of pivot, and to cause the cable connect fitting to interfere with the brake lever housing.

Another prior art device is described in U.S. Pat. No. 5,448,927 and entitled "Adjustable Leverage Brake Lever" and issued to Wayne R. Lumpkin on Sep. 12, 1995. This device enables the pull point of the brake cable to be adjusted radially with a threaded bolt to any one of a number of fixed radial positions which are adjustable to be closer to or farther from the pivot point. The central problem with this device is that it does not allow the brake cable to return to a position which would leave the brakes in the maximum open position. Thus, where the adjustment is positioned to increase the mechanical advantage, it also reduces the range of travel of the brake cable from both its maximally extended and maximally retracted positions and toward the midpoint of the two extremes. This disenables the brakes from assuming the maximum open position and can cause unwanted rubbing of the brake shoe on the rim.

What is therefore needed is a braking system which will allow adjustment during riding to insure that the rider has maximum brake control and to insure that the rider will always be able to adjust the brakes to insure that full braking may be applied before the brake lever is limited in its travel by the handle bar. The system should not have significant resistance to adjustment of the brake, and should operate as smoothly and as effortlessly as possible.

SUMMARY OF THE INVENTION

The brake lever system disclosed includes a cable attachment fitting which rides within an open slot which tilts away from the departure point of the brake cable as a brake lever body is pivoted away from a brake lever housing. A threaded screw or rod carried within the open slot can be adjusted to raise or lower the height of a rectangular or other block which rides without turning within the open slot. The metal block forms an adjustable lower limit below which the cable attachment fitting cannot travel. The open slot is angled to encourage the cable attachment fitting to ride to the top of the open slot when the brake lever body is in the maximum brake off position to enable the brake cable to be maximally returned to enable the brakes to open to their widest position. When activated, the cable attachment fitting 117 moves in the direction of the point of pivot and the mechanical advantage is increased to the limit permitted by the metal block within the open slot. This produces a rapid closure of the brakes during the first extent of brake engagement, and a much less rapid closure as the brake lever body is displaced from the brake lever housing. The brake lever system of the present invention can be adjusted during the riding operation of the bicycle to adjust for brake pad wear and for changing conditions which might cause the brake cable to expand or contract.

BRIEF DESCRIPTION OF THE DRAWINGS

The invention, its configuration, construction, and operation will be best further described in the following detailed description, taken in conjunction with the accompanying drawings in which:

FIG. 3 illustrates a plan view of the brake lever system of the present invention;

FIG. 4 illustrates a top view of the brake lever system of the present invention;

DETAILED DESCRIPTION OF THE PREFERRED EMBODIMENT

Figure 1:
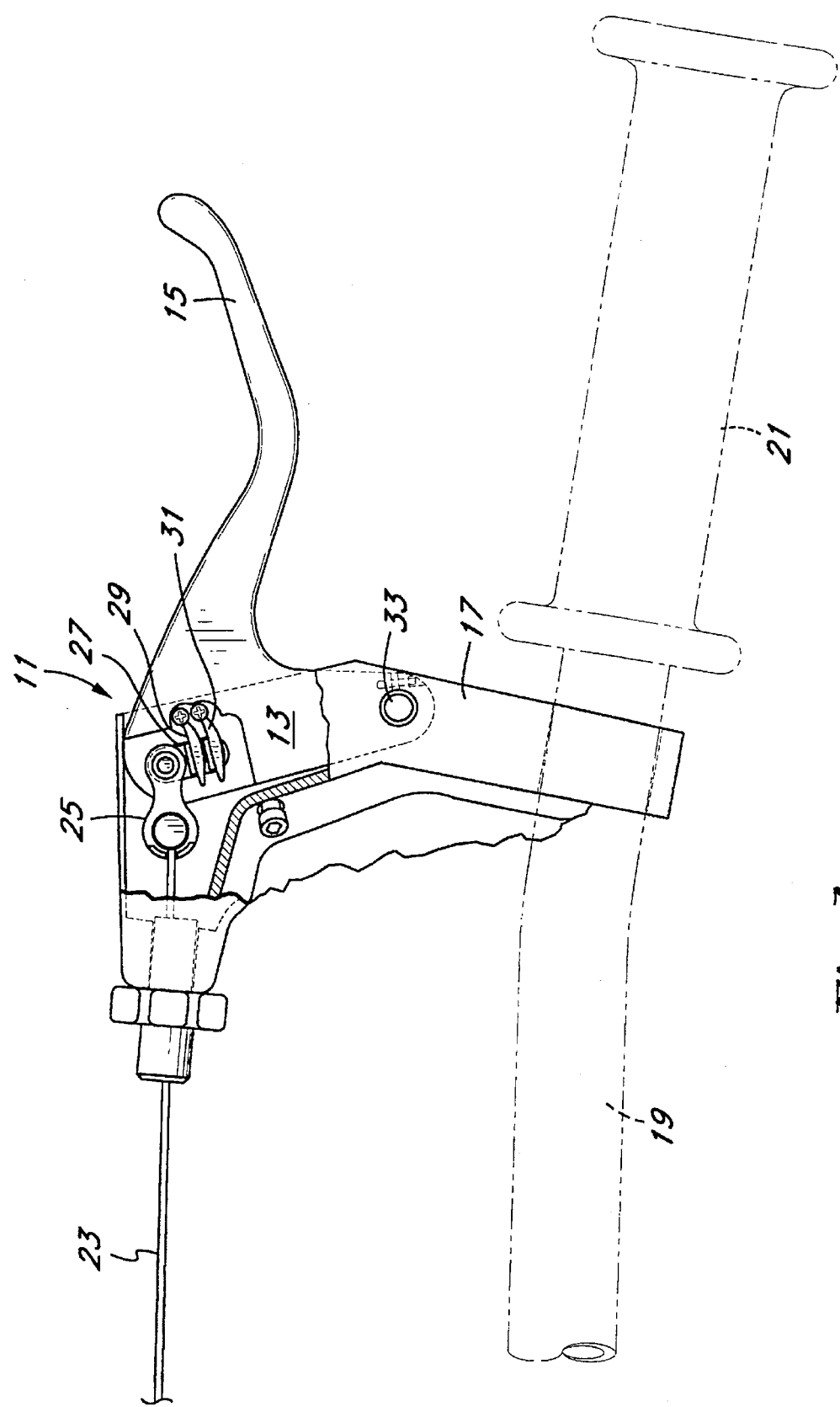
FIG. 1 is a partially broken away view illustrating a prior art braking system using limiting spacers.

Referring to FIG. 1, a prior art embodiment of a brake lever system 11 illustrates a handle body portion 13, having an extended lever portion 15 and pivotally depending from a brake lever housing 17. The brake lever housing 17 is attached to a handle bar section 19 such that the lever portion 15 opposes a handle 21.

A cable 23 is attached to a brake cable fitting 25 which rides within an open slot 27 in the handle body portion 13. A series of removable spacers 29, 31 prevent the brake cable fitting 25 from moving downwardly within the open slot 27 as the handle body portion 13 is angularly displaced with respect to the brake lever housing 17. The user can remove tiny screws to sequentially remove the spacer 29 and perhaps the spacer 31 from within the open slot 27.

Once spacer 29 is removed, for example, the fitting 25 can move further toward the axis of pivot of the handle body portion 13 with respect to the brake lever housing 17. This pivot point is shown as a pin 33 which joins the handle body portion 13 to the brake lever housing 17. Upon activation of the brake lever 15, the fitting 25 will move to the bottom of the slot 27 to give a unit jump to the most mechanically advantaged position. With the brake lever system 11 of FIG. 1, the only way to limit the maximum mechanical advantage is to re-insert one or both of the spacers 29 and 31 which requires a tiny screwdriver to re-insert screws holding the spacers 29 and 31 in place.

Figure 2:
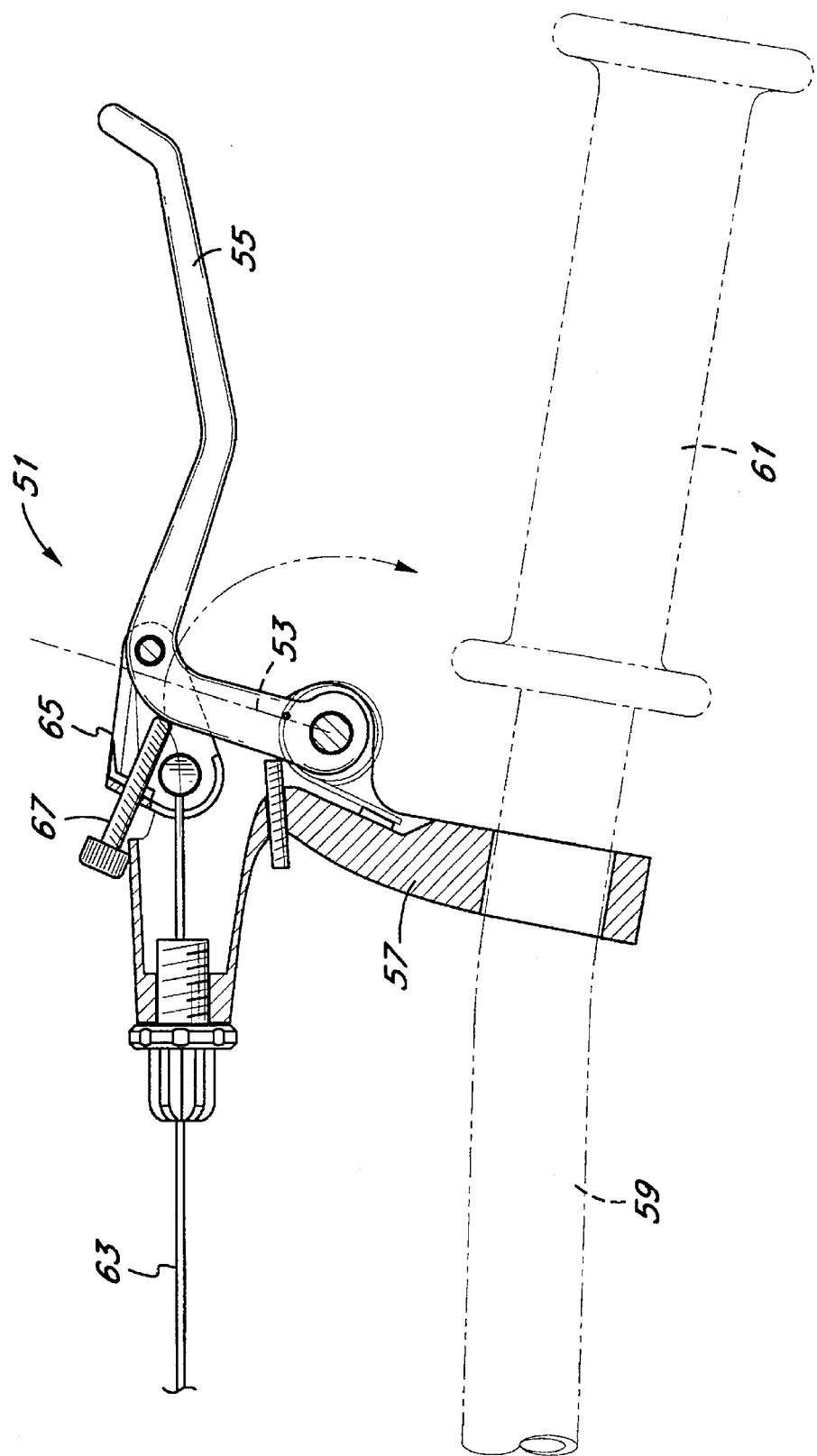
FIG. 2 is a partial sectional view of a prior art braking system using an overlapping set screw device to be urged into a set off position.

Referring to FIG. 2, a second prior art brake lever system 51 is shown. Brake lever system 51 illustrates a handle body portion 53 having an extended lever portion 55 and pivotally depending from a brake lever housing 57. The brake lever housing 57 is attached to a handle bar section 59 such that the lever portion 55 opposes a handle 61.

A cable 63 is attached to a brake cable fitting 65 which is pivotally attached to handle body portion 53. The cable fitting 65 also included a set off screw 67 which threadably engages the cable fitting 65 and can limit the pivot of the cable fitting 65 with the pivotal displacement of the handle body portion 53. By forcing the cable fitting 65 away from the handle body portion 53, the cable 63 is pulled from a point radially more outward from the handle body portion 53. However, the set screw is not easy to turn and requires a hex wrench. Further, the head of the screw sits close to or within the brake lever housing 57. The forces handled by the set off screw 67 are high and therefore it is expected that a manual adjustment is difficult to make. The radial pull cannot be lowered, but only raised by compression of the set off screw 67. Further, there is a jump transition represented by the instant transition from one radial pull point to a second radial pull point.

The preferred embodiment of the invention is described beginning at FIG. 3. A plan view of a brake lever system 101 illustrates a brake lever housing 103 which has a lower portion 105 suitable for attachment to a bicycle handle bar.

There is an adjustment knob 107 extending from a brake lever body 109. Brake lever body 109 sits adjacent to an extended brake lever 111. To the left of the brake lever system 101 is a brake cable 113 extending into standard threaded inserts 115.

Referring to FIG. 4, a top view of the brake lever system 101. Shown in phantom is a cable attachment fitting 117 having an overall "U" shape. The bottom portion of the "U" shape engages the cable 113 end, while the side portions of the "U" shape extend toward and outside of the brake lever housing.

Figure 5:
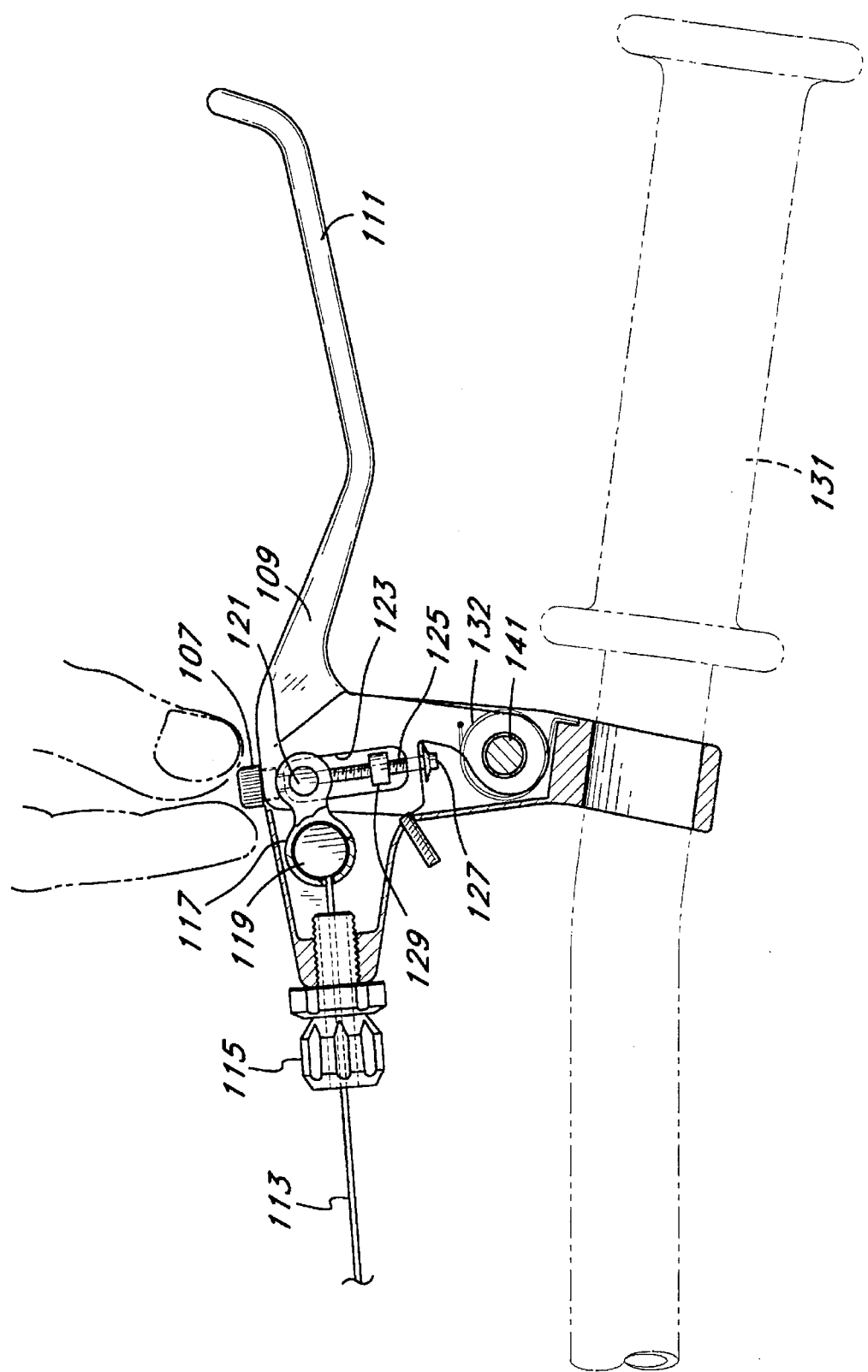
FIG. 5 illustrates a sectional view from the perspective shown in FIG. 3, but with respect to a handle bar portion shown in phantom.

Referring to FIG. 5, a side sectional view of the brake lever system 101 is shown. The cable 113 terminates in an enlarged portion 119 which enables the cable attachment fitting 117 to have axial engagement with the cable 113. The ends of the "U" shaped cable attachment fitting 117 have apertures for engaging cross bar which acts as a cable fitting support 121. The cross bar extends traversely through an open slot 123 in the brake lever body 109.

A threaded rod or screw 125 extends through the open slot 123 in a longitudinal orientation. The threaded screw 125 enters the brake lever body 109 from the outside, extends into the slot through its outer end and through the slot to the inner end, through the inner end and out of the rear side of the brake lever body 109. The tip end of the threaded screw 125 is secured by a lock washer 127 to insure that the threaded screw 125 can be axially rotated within the brake lever body 109, but will not be axially removable from the brake lever body 109.

Also shown surrounding the threaded screw 125 is a rectangular metal block 129. The block 129 lightly engages the inside of the slot 123 and is urged upwardly and downwardly in the slot 123 by the turning of the threaded bolt 125. The block 129 limits the downward extent of travel of the 117. By making the limit variable beneath the cable attachment fitting 117, the cable attachment fitting 117 is always free to return to a position which returns the brake cable 113 to a position associated with the maximum open brake position.

This differs significantly from the configuration of the 5,448,927 patent in which the member which engages the cable attachment fitting is fixed on the threaded screw. Fixation on the threaded screw, or any other structure on the handle creates a bilateral mechanical advantage. When the cable attachment fitting is fixed at its highest position, the minimum mechanical advantage is had, along with the maximum open brake on release of the brake lever. As the cable attachment fitting is adjusted closer to the point of pivot, the mechanical advantage is increased, but a release of the lever will not return the brakes to the maximum open position. This is because the cable would retain a portion of its displacement in the direction of the handle even when the brake lever was fully released.

The brake lever system 101 captures the benefits of mechanical advantage on braking with the advantages of enabling the brake to assume the full open position when the brake handle is released. This is achieved because the cable fitting support 121 overlies and does not mechanically engage the threaded screw 125. In fact, the mechanism shown in FIG. 5 can be constructed such that the cable fitting support 121 does not even touch the threaded screw 125. In this circumstance, the outer portion of the cable fitting support 121 could be sufficiently large to slide against the inside surfaces of the slot 123.

The rectangular metal block 129 may also be sized to gently ride within the slot 123, with sufficient contact and clearance that the block 129 may have some play within the open slot 123. However, the rectangular block 129 will definitely contact the lower side of either the cable attachment fitting 117 or the cable fitting support 121 when the brake lever system 101 is engaged, since the rectangular block 129 limits the downward displacement of the cable attachment fitting 117.

Initially, the brake lever system 101 will be adjusted to insure that full open brake is available when the lever is released, and that the rectangular block is low enough that the maximum mechanical advantage is obtained and that the brakes are fully engaged at a point before the extended brake lever 111 touches handle 131 shown in phantom. As the brakes wear, the lever 111 will come closer and closer to the handle 131. When this occurs, the rider can simply adjust the threaded screw 125 by the knob 107 to reduce the mechanical advantage and insure that the brakes are fully engaged before the lever 111 is limited in its travel by the handle 131.

In addition to effects from brake wear, other effects may be present. The brake cable 113 may significantly elongate during hot conditions and significantly contract in cold conditions. In this event, a simple manual adjustment can be made during the riding of the bicycle in order to bring the brake lever system 101 back into a preferred operational region. A spring 132 surrounds the pivot axis and urges the brake lever body 109 to a maximum open brake position.

Figure 6:
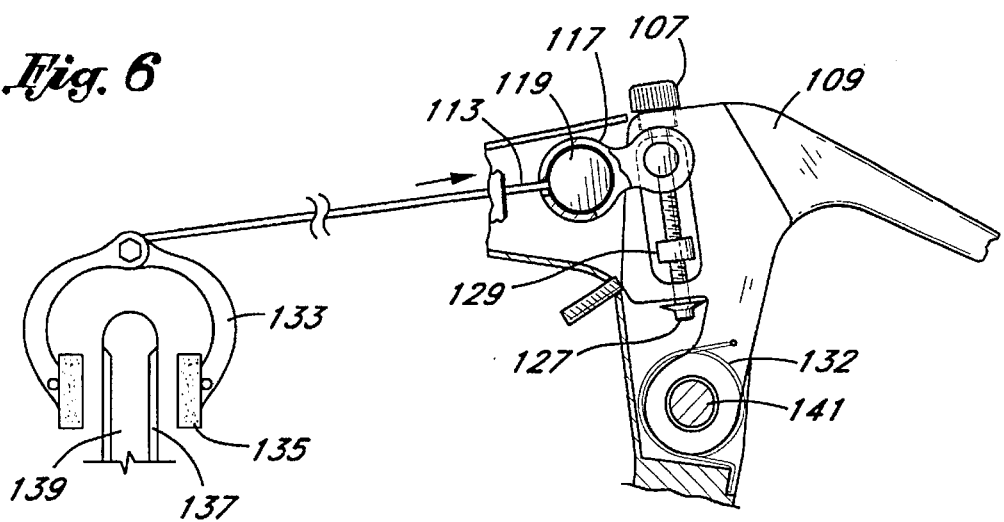
FIG. 6 illustrates a view of the brake lever system of the present invention in the unactuated state.
Figure 7:
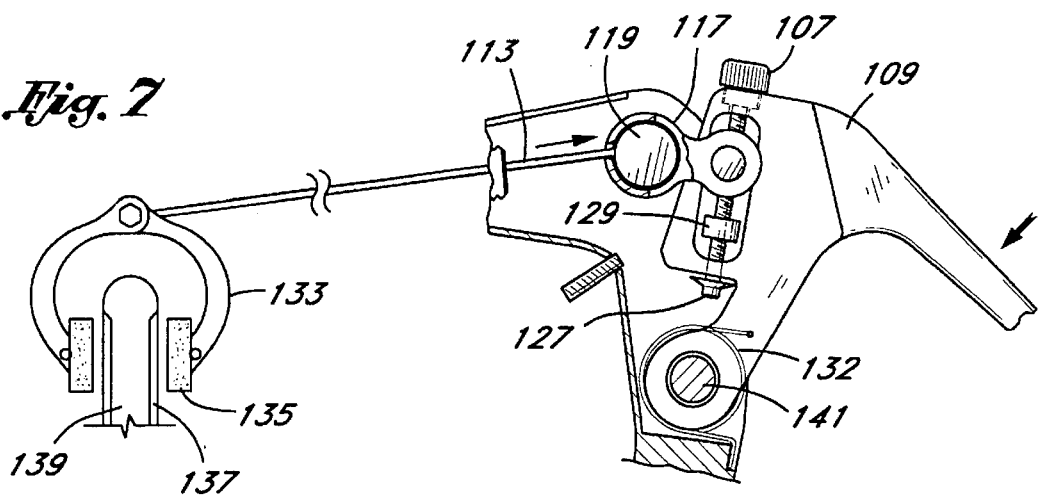
FIG. 7 illustrates a view of the brake lever system in the midpoint of its actuation.
Figure 8:
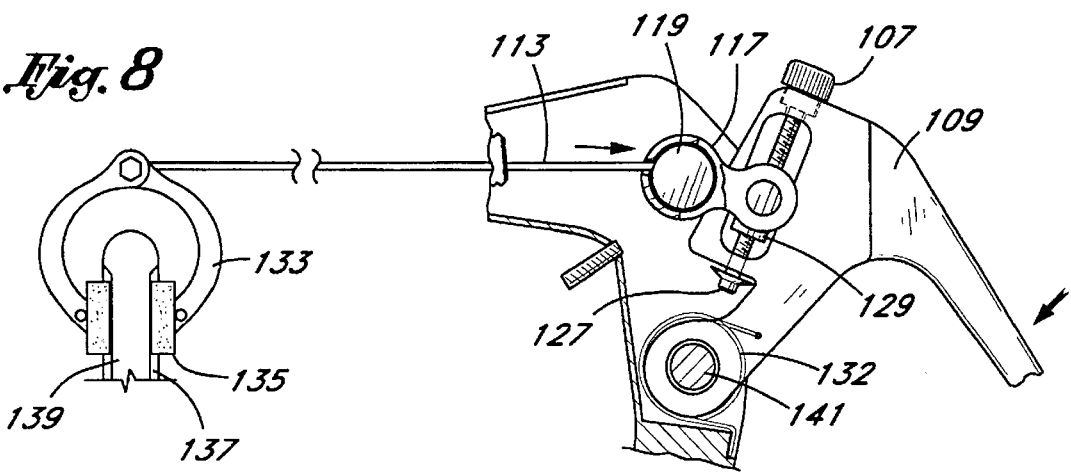
FIG. 8 illustrates the brake lever system of the present invention in a state of full engagement.

The specific operation of the brake lever system is shown in three positions with regard to FIGS. 6–8. FIG. 6 illustrates a closeup view of the brake lever system 101, as was shown in FIG. 5, but with a schematic connection to a brake schematic. The brake cable 113 is connected to a set of brake calipers 133. Although the calipers 133 are shown schematically, it is understood that modern braking systems can be of several types and will typically involve a good deal more detail than is shown in the FIG. 6.

At the ends of the brake calipers 133 are a pair of brake pads 135 which will engage the rim 137 of a bicycle wheel 139 shown in schematic format. As can be seen in FIG. 6, the brake lever body 109 is in a full open brake position. This occurs because when the brake lever body 109 is in the fully closed position, the open slot 123 is slightly tilted to encourage the cable attachment member 117 to be urged toward the upper end of the open slot 123.

As the brake lever body 109 is displaced away from the brake lever housing 103, the cable fitting support 121 and the cable attachment fitting 117 begin to be displaced downwardly along the threaded screw 125 and downwardly within the open slot 123. As the cable fitting support 121 and the cable attachment fitting 117 are displaced closer to the pivot point represented by the pinned attachment of the brake lever body 109 to the brake lever housing 103 at the connection 141, the mechanical advantage is increased.

As the brake lever body 109 is continued to be displaced with respect to the brake lever housing 103, the cable fitting support 121 and the cable attachment fitting 117 continue downward until the rectangular block 129 is engaged by the cable fitting support 121. This limits the maximum downward displacement of the cable fitting support 121 and the cable attachment fitting 117. The adjustment of the knob 107 to displace the rectangular block 129 either toward or away from the point of pivot represented by pin or bolted attachment 141 will control the mechanical advantage to be achieved. Easy manual adjustment between braking periods is enabled. Note in FIG. 8 that the calipers 133 are now fully closed about the wheel 139.

The use of a slot as a transition between the upper position and the lower position, enables a smooth transition from one point of mechanical advantage to another. Unlike the two pivot points encountered in FIG. 2, the system 101 enables a smooth adjustable transition. Because the mechanical advantage is changing, note that FIG. 7, the half way transition of the brake lever body 109 represents a two-thirds closure of the calipers 133 and brake pads 135 against the bicycle wheel 139. The remaining closure is accomplished with even greater mechanical advantage as shown in FIG. 8.

While the present invention has been described in terms of a mechanical brake lever system for use with a bicycle, one skilled in the art will realize that the structure and techniques of the present invention can be applied to many appliances. The present invention may be applied in any situation where a smooth, adjustable transition is to be made from one mechanical advantage to another.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. An adjustable brake control for a bicycle comprising:

a brake lever housing for engagement with a brake cable;

a brake lever body including an elongate open slot pivotally attached to said brake lever housing about a first axis of pivot and having said brake cable attached to said brake lever body and continuously displaceable in the radial direction of said first axis of pivot;

an adjustment knob, exterior to and supported by said brake lever body and connected to said limiting means, for controlling said limiting means to control the limit upon the displacement in the radial direction toward said first axis of pivot which said brake cable coupling can move;

a threaded rod supported centrally within said slot and rotatably supported by said brake lever body, one end of said threaded rod extending through said brake lever body and engaging said adjustment knob;

a block having a central threaded bore and threadably connected to said threaded rod to move longitudinally within said slot as said threaded rod is turned for providing a variable limit upon the displacement in the radial direction toward said first axis of pivot which said brake cable coupling can move;

a fitting support longitudinally displaceable within said slot and having a central bore larger than the external diameter of said threaded rod, and in its longitudinal displacement in the direction of said first axis of pivot by said block;

a cable attachment fitting attached to said fitting support to enable an end of said brake cable to be longitudinally pivotally displaced along with said fitting support and wherein said cable attachment fitting has an overall "U" shape which both engages said fitting support, said cable attachment and said fitting support enclosing a portion of said brake lever body.

2. The adjustable brake control as recited in claim 1 wherein said cable attachment fitting pivots about a second axis defined by a set of points of attachment of said cable attachment fitting to said fitting support.

3. An adjustable brake control for a bicycle comprising:

a brake lever housing for engagement with a brake cable;

a brake lever body having an elongate open slot pivotally attached to said brake lever housing about an axis of pivot;

an adjustment knob, supported by said brake lever body for providing manual control of said high mechanical advantage transition means, for transition between a low mechanical advantage as said brake lever body begins pivotal movement away from said brake lever housing to an adjustably limited high mechanical advantage as said brake lever body pivots away from said brake lever housing;

a threaded rod supported centrally within said slot and engageable by said adjustment knob;

a cable attachment fitting support freely longitudinally displaceable within said slot;

a limiting block moveable longitudinally within said slot to limit the extent of travel of said cable attachment fitting support.

4. The adjustable brake control as recited in claim 3 and further comprising a cable attachment fitting pivotally attached to said cable attachment fitting support for attachment of said brake cable.

5. The adjustable brake control as recited in claim 4 wherein said cable attachment fitting support is freely movable along said threaded rod.

6. The adjustable brake control as recited in claim 4 wherein said cable attachment fitting support rides against said slot.

7. The adjustable brake control as recited in claim 3 wherein said threaded rod is axially fixed within said slot and rotatable with said knob, and wherein said limiting block threadably engages said rod and is prevented from turning with said threaded rod by engagement with a portion of said brake lever body.

\* \* \* \* \*